L. G. HANDY.
WHEEL.
APPLICATION FILED JUNE 4, 1910.
1,013,999.
Patented Jan. 9, 1912.
2 SHEETS—SHEET 1.
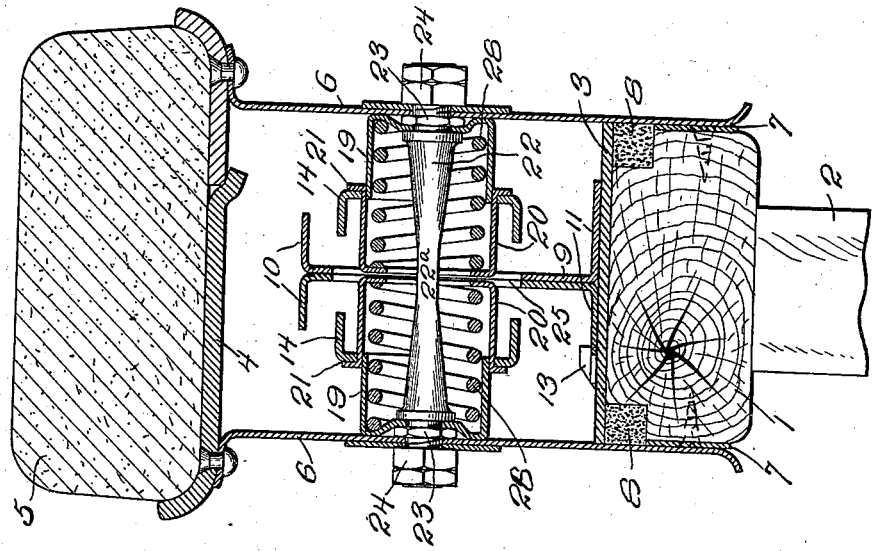
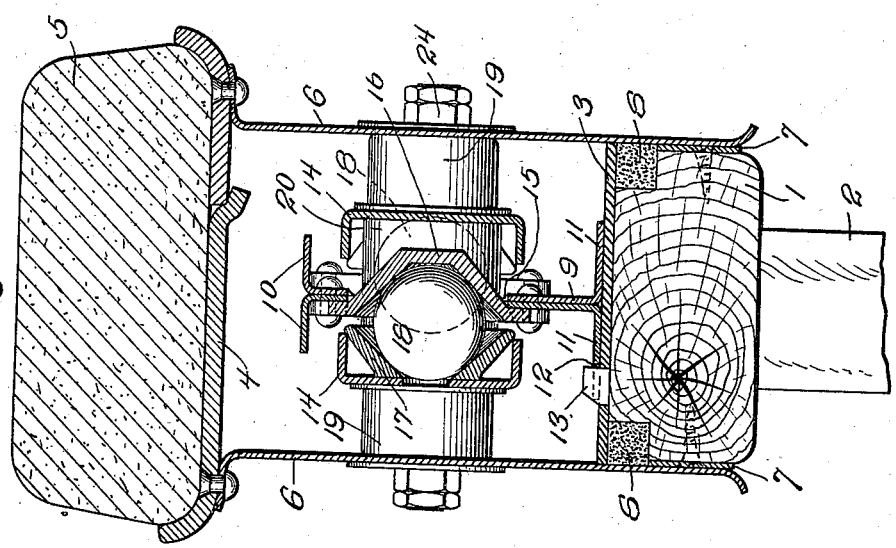
WITNESSES
INVENTOR
L. G. Handy
BY
ATTORNEY

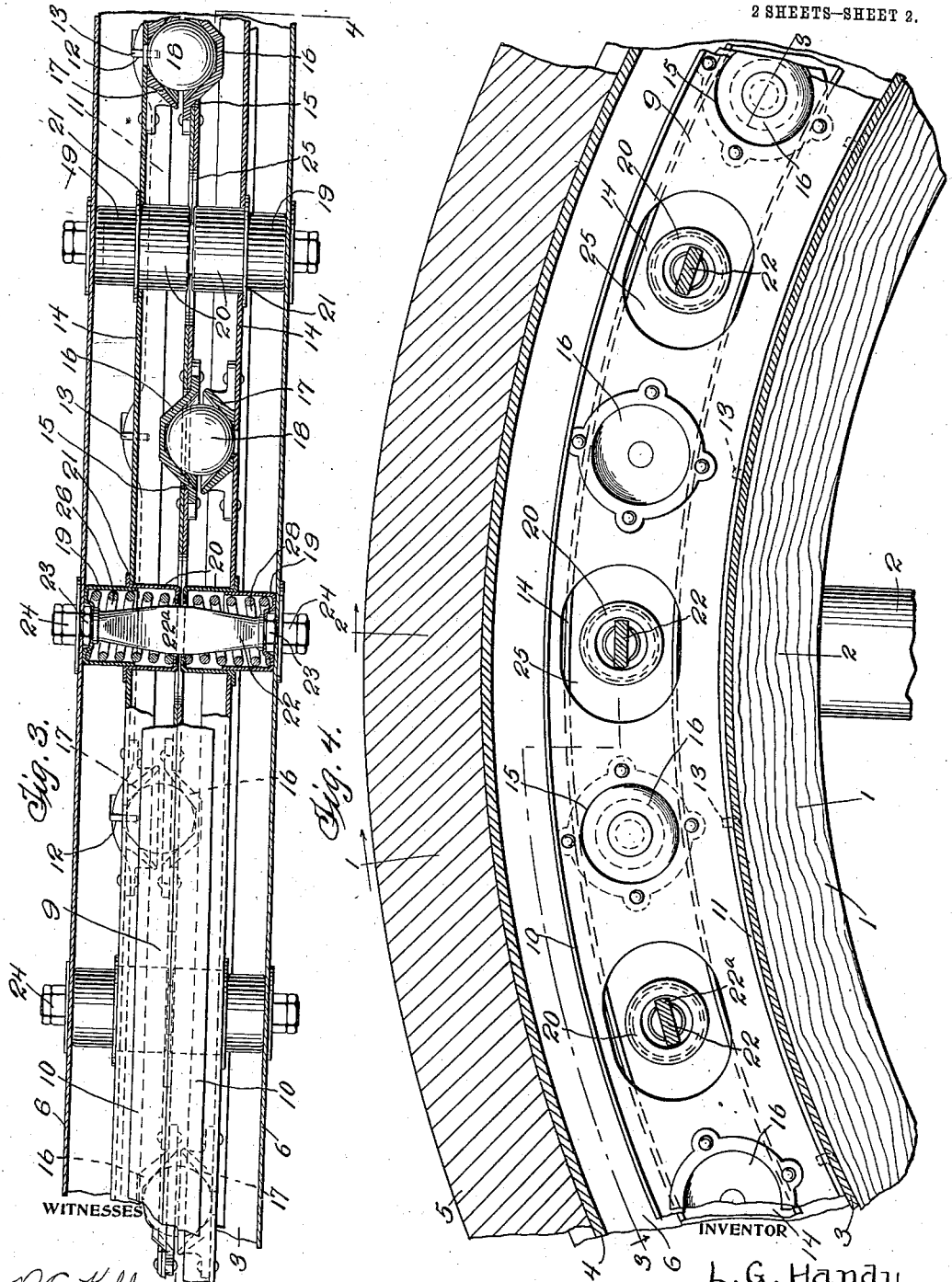

UNITED STATES PATENT OFFICE.

LEVIN GESSFORD HANDY, OF RUTHERFORD, NEW JERSEY, ASSIGNOR TO WILLIAM C. DICKERMAN, OF NEW YORK, N. Y.

WHEEL.

1,013,999. Specification of Letters Patent. Patented Jan. 9, 1912.

Application filed June 4, 1910. Serial No. 565,068.

*To all whom it may concern:*

Be it known that I, LEVIN GESSFORD HANDY, residing at Rutherford, New Jersey, and being a citizen of the United States, have invented certain new and useful Improvements in Wheels, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a transverse vertical section of a fragment of a wheel embodying the features of the present invention, the section being taken on the plane indicated by line 1—1 of Fig. 4. Fig. 2 is a similar section taken on the plane indicated by line 2—2 of Fig. 4. Fig. 3 is a circumferential section taken on the planes indicated by line 3—3 of Fig. 4, parts being seen in extension. Fig. 4 is a vertical section taken on the plane indicated by line 4—4 of Fig. 3.

Referring to the drawings by numerals, 1 indicates a felly, 2 the spokes, and 3 the fixed rim of any suitable wheel body, which elements, with the hub not illustrated, constitute the wheel body, said wheel body being provided with a detachable rim 4 carrying a tire 5 for muffling purposes. Rim 4 may be and is preferably formed of two sections, to each of which is connected an annular guide plate 6, said plates extending past and on opposite sides of and slidingly engaging the felly 1. Circumferential wear plates 7—7 may be provided for the sides of the felly 1, and said felly is formed with annular rabbets at its outer circumferential corners which are preferably filled with packing 8. Disposed in the circumferentially median line of a wheel body, and surrounding the same between the wheel body and rim, is a ring 9 comprised of a pair of annuli connected together and having their flat faces in contact, and being formed with circumferential marginal flanges 10—10 and 11—11 outstanding laterally therefrom. The flanges 11 form a band snugly fitting rim 3, and one of said flanges is formed with transverse notches 12 spaced apart about the wheel and through which extend lugs 13 outstanding radially from rim 3. A pair of concentric rings 14 is disposed between the wheel body and rim with one ring 14 at each side of ring 9, and ring 9 is formed at intervals with apertures 15 through which extend cups 16 fixed to the ring 9. Each alternate cup 16 faces in one direction, and the other of said cups in the opposite direction. Rings 14 are provided with cups 17 corresponding with the cups 16, and respectively facing in opposite directions relative thereto, and forming pairs with the cups 16. A ball 18 is disposed between the cups of each of said pairs. To afford resilient means of maintenance of the frictional connection thus provided between the rings 14 and ring 9, the said rings 14 are pressed laterally toward ring 9 by springs 28—28, the outer end of each spring 28 engaging a cup 19, and the inner end engaging a cup 20 telescoping the cup 19. Each cup 20 is provided with an annular flange 21 at its outer edge resting against and fixed to the outer face of the respective ring 14, the cup 20 extending through the ring toward the other ring for accommodating a spring 28 of greater length than would otherwise be accommodated. As many of the cups 20 may be provided as desired, and each with its corresponding telescoping cup 19 forms a guide for the respective ring 14 in its lateral movements. A bolt 22 extends through each set of cups 20 and 19 and connects the guide plates 6, a set of cups 20 and 19 being preferably provided for each of the rings 14 at each bolt 22, but one of such sets may be omitted alternately at alternate sides if desired. Each bolt 22 is formed with an annular shoulder at each end, which engages the base of the respective cup 19, the cups being retained in position by a nut 23 threaded on to the threaded portion of the bolt which extends beyond the respective annular shoulder and through the base of the respective cup and given contiguous guide plate 6, the bolt being connected to the guide plate at its opposite ends by nuts 24.

Obviously, each bolt 22 penetrates the bases of its respective cups 20, and at the point of such penetration said bolt is flattened circumferentially with respect to the wheel, so that independent radial play thereof, with respect to the ring 9, may be accommodated by an aperture 25 through the ring of minimum radial dimension, the aperture being elongated circumferentially for accommodating the width of the bolt in its circumferential play.

It is to be noted that in operation, edgewise movement of the rings 14, with respect to ring 9, will always be accompanied by moving apart or lateral shifting of the respective cups 20 which therefore do not require to be accommodated by the aperture 25, and hence the flattening of the bolt, as at 22ª, admits of the leaving of sufficient of the webs of the annuli comprising ring 9 for strengthening and stiffening purposes.

In operation, the thrust of the load sustained by the wheel body is transmitted through ring 9, cups 16, balls 18, cups 17, rings 14, cups 20, springs 28, cups 19, bolts 22, and guide plates 6, to the demountable rim. The shocks and jars sustained by the rim due to unevenness and irregularities of the roadway will be transmitted inversely and thus largely absorb by the frictional and resilient connections, the balls 18 riding out the inclined walls of the cups and shifting the rings 14 laterally from ring 9 against the pressure of springs 28. Variations in the amount of such shifting will of course correspond to variations in the load sustained as well as shocks absorbed.

What I claim is:

1. In a wheel, a wheel body, a rim therefor, a circumferentially disposed ring engaging the wheel body, coaxial rings disposed at either side of the first mentioned ring, guide plates fixed to the rim and extending past said rings, cups fixed to each of the coaxial rings, cups fixed to each of the guide plates, and telescoping with the respective first mentioned cups and forming sets therewith, a spring within each of the sets of telescoping cups pressing the coaxial rings toward the first mentioned ring, and means of frictional engagement between the first mentioned ring and the coaxial rings.

2. In a wheel, a wheel body, a rim therefor, a ring surrounding the wheel body and engaging the same, coaxial rings disposed at either side of the first mentioned ring, a cup fixed to each of the coaxial rings, a bolt extending through all of said rings and connected to the rim, said bolt being flattened at the place of passage through the first mentioned ring, said first mentioned ring being formed with an aperture for permitting of the passage of said bolt, and means of frictional engagement between the coaxial rings and the first mentioned ring, cups carried by the bolt and telescoping with the first mentioned cups, and springs interposed between the first and second mentioned cups and disposed for pressing the coaxial rings toward the first mentioned ring.

3. In a wheel, a wheel body, a rim therefor, a ring surrounding the wheel body and engaging the same, coaxial rings disposed at either side of the first mentioned ring, said co-axial rings being provided with stiffened flanges upon their inner and outer edges, a cup fixed to each of the coaxial rings, a bolt extending through all of said rings and connected to the rim, said bolt being flattened circumferentially of the wheel at the place of passage through the first mentioned ring, said first mentioned ring being formed with an aperture for permitting of the passage of said bolt, and means of frictional engagement between the coaxial rings and the first mentioned ring, cups carried by the bolt and telescoping with the first mentioned cups, and springs interposed between the first and second mentioned cups and disposed for pressing the coaxial rings toward the first mentioned ring.

4. In a wheel, a wheel body, a rim therefor, a circumferentially disposed ring having means of engagement with the wheel body, and means of engagement between the ring and rim, said ring comprising annuli having contacting webs, and having their edge portions formed into marginal flanges, one of the means of engagement of the ring being resilient.

5. In a wheel, a wheel body, a rim therefor, a circumferentially disposed ring between the rim and wheel body, said ring comprising annuli having their webs contacting and their edge portions formed into marginal flanges, one of said flanges being recessed, radial lugs extending from the wheel body into the recesses of said flange, and means of resilient engagement between said ring and the rim.

6. In a wheel, a wheel body, a rim therefor, a circumferentially disposed ring engaging the wheel body, coaxial rings disposed at either side of the first mentioned ring, cups connected to the first mentioned ring and extending through the same intermediate the edges thereof and alternately facing the respective coaxial ring, corresponding cups carried by the coaxial rings and forming pairs with the first mentioned cups, a ball disposed between and within the cups of each pair, and resilient connections between the concentric rings and the rim.

7. In a wheel, a wheel body, a rim therefor, a circumferential ring carried by the wheel body, an annular ring on each side of said circumferential ring, guide plates attached to said rim adapted to carry said annular rings, friction members between each of said annular rings and said circumferential ring, and resilient means between each of said annular rings and said guide plates.

8. In a wheel, a wheel body, a rim therefor, guide plates extending from the rim, a rigid ring attached to the wheel body and located between the rim and the wheel body, co-axial rings disposed on either side of the first mentioned ring, cup members carried by said co-axial rings, cup members extending from said guide plates in telescoping engagement with the cup members carried by said co-axial rings, bolts engaging said guide plates and extending through said first mentioned ring and having a flattened portion intermediate said guide plates, and resilient springs carried by said bolts.

9. In a wheel, a wheel body, a rim therefor, a circumferential rigid ring comprising annuli having their webs contacting and their edge portions formed into flanges, the inner flanges being in engagement with the wheel body, and friction means intermediate said circumferential ring and said rim.

In witness whereof I have hereunto set my hand in the presence of two witnesses.

LEVIN GESSFORD HANDY.

Witnesses:
 EDGAR M. KITCHIN,
 FRANK V. COOPER.

Copies of this patent may be obtained for five cents each, by addressing the "Commissioner of Patents, Washington, D. C."